(12) United States Patent
Kobayashi et al.

(10) Patent No.: US 12,291,163 B2
(45) Date of Patent: May 6, 2025

(54) SIDE AIRBAG DEVICE

(71) Applicant: Autoliv Development AB, Vargarda (SE)

(72) Inventors: Yuto Kobayashi, Kanagawa (JP); Tsutomu Sakurai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 20 days.

(21) Appl. No.: 18/556,034

(22) PCT Filed: Apr. 8, 2022

(86) PCT No.: PCT/JP2022/017362
§ 371 (c)(1),
(2) Date: Oct. 18, 2023

(87) PCT Pub. No.: WO2022/224844
PCT Pub. Date: Oct. 27, 2022

(65) Prior Publication Data
US 2024/0198951 A1   Jun. 20, 2024

(30) Foreign Application Priority Data
Apr. 20, 2021 (JP) .................. 2021-070754

(51) Int. Cl.
*B60R 21/231* (2011.01)

(52) U.S. Cl.
CPC .............. *B60R 21/23138* (2013.01); *B60R 2021/23146* (2013.01)

(58) Field of Classification Search
CPC .... B60R 21/23138; B60R 2021/23146; B60R 2021/23115; B60R 2021/23161
See application file for complete search history.

(56) References Cited

U.S. PATENT DOCUMENTS 5,730,464 A * 3/1998 Hill ................... B60R 21/23138
280/730.2
6,270,113 B1 * 8/2001 Wipasuramonton ........................
B60R 21/2346
280/730.2

(Continued)

FOREIGN PATENT DOCUMENTS

DE   102020206551 A1 * 12/2021
JP   2005-119510 A    5/2005

(Continued)

OTHER PUBLICATIONS

Translation of DE102020206551A1.*

*Primary Examiner* — Paul N Dickson
*Assistant Examiner* — Shams Dhanani
(74) *Attorney, Agent, or Firm* — Harness, Dickey & Pierce, P.L.C.; Stephen T. Olson

(57) ABSTRACT

A side airbag device comprising a bag-like cushion that is provided to a side section of a seat back of a vehicle seat and inflates and expands toward the side of a passenger in the vehicle seat using a gas. The cushion includes: a first part having four sides and including a first chamber; a second part that has four sides, is adjacent to the first part, and includes a second chamber; and a third part that has four sides, is adjacent to the first part and the second part. When inflated and expanded, the cushion is a triangular column that is a columnar shape having a space open on both the top and bottom and surrounded by the first part in which the first chamber is inflated and expanded, the second part in which the second chamber is inflated and expanded, and the non-inflated third part.

17 Claims, 6 Drawing Sheets

(56) References Cited

U.S. PATENT DOCUMENTS

| | | | |
|---|---|---|---|
| 9,994,181 B1* | 6/2018 | Dubaisi | B60R 21/207 |
| 10,300,878 B2* | 5/2019 | Park | B60R 21/207 |
| 10,336,283 B2* | 7/2019 | Rickenbach | B60R 21/233 |
| 11,351,946 B1* | 6/2022 | Faruque | B60R 21/23138 |
| 11,787,361 B1* | 10/2023 | Patel | B60R 21/2338 |
| | | | 280/730.2 |
| 2012/0193896 A1* | 8/2012 | Turnbull | B60R 21/2334 |
| | | | 280/729 |
| 2015/0097359 A1* | 4/2015 | Rickenbach | B60R 21/23138 |
| | | | 280/729 |
| 2018/0354449 A1* | 12/2018 | Markusic | B60R 21/23138 |
| 2019/0152422 A1* | 5/2019 | Deng | B60R 21/233 |
| 2022/0355759 A1* | 11/2022 | Moran | D03D 11/02 |
| 2022/0396231 A1* | 12/2022 | Ohno | B60R 21/207 |
| 2023/0064279 A1* | 3/2023 | Ohno | B60R 21/2338 |
| 2023/0249641 A1* | 8/2023 | Weimer | B60R 21/233 |
| | | | 280/728.1 |
| 2023/0256931 A1* | 8/2023 | Weimer | B60R 21/23138 |
| | | | 280/730.1 |
| 2023/0264645 A1* | 8/2023 | Faruque | B60R 21/232 |
| | | | 280/730.2 |
| 2023/0311802 A1* | 10/2023 | Jaworowicz | B60R 21/207 |
| | | | 280/730.2 |
| 2023/0339421 A1* | 10/2023 | Yamamoto | B60R 21/207 |
| 2023/0339422 A1* | 10/2023 | Ohno | B60R 21/233 |

FOREIGN PATENT DOCUMENTS

| | | |
|---|---|---|
| JP | 2008-296642 A | 12/2008 |
| JP | 2021-049898 A | 4/2021 |
| WO | 2019/193987 A1 | 10/2019 |

* cited by examiner (a)

(b)

(a)

(b)

(c)

(d)

SIDE AIRBAG DEVICE

TECHNICAL FIELD

The present invention relates to a side airbag device provided with a bag-shaped cushion that expands and deploys to a side of an occupant of a vehicle seat in the event of a vehicle side impact or the like.

BACKGROUND ART

Airbag devices have generally become standard equipment in vehicles in recent years. An airbag device is a safety device that is operated in the event of an emergency such as a vehicle collision or the like to receive and protect an occupant by expanding and deploying a cushion based on gas pressure. As an example, a side airbag device is provided with a bag-shaped cushion that expands and deploys to a side of an occupant of a vehicle seat in the event of a vehicle side impact or the like.

Normally, when a vehicle receives an impact in a lateral direction, the occupant moves in a vehicle width direction. For example, there are two main types of side airbags that protect an occupant in the event of a side impact in which an object such as another vehicle, a utility pole, or the like (impact object) impacts a front passenger seat side door. The first is a so-called near side airbag. The near side airbag expands and deploys between the passenger seat and the side door and prevents an occupant on an impact object contact side (occupant on near side; occupant in passenger seat in this case) from impact with the side door. The second is the so-called far side airbag (for example Patent Document 1). The far side airbag expands and deploys between the driver seat and the passenger seat and protects an occupant moving to the center of the vehicle due to impact from the lateral direction (far side occupant; occupant in driver seat in this case).

Patent Document 1 describes an airbag device with a center airbag and retainer stowed in the seatbacks of each of the two adjacent seats of the vehicle. Both of the center airbags restrain occupants from the inside in the vehicle width direction upon expansion and deployment. In addition, by being stowed in the seatback, the retainers cause the corresponding center airbag to expand and deploy in an oblique direction inside the vehicle.

According to Patent Document 1, the center airbags stowed in each of the adjacent two seats expand and deploy between the seats and mutually come into contact and engage in the case of a side collision of the vehicle, enabling effective restriction of movement of the occupant in the vehicle width direction.

RELATED ART DOCUMENTS

Patent Documents

Patent Document 1: Japanese Unexamined Patent Application 2008-296642

SUMMARY OF THE INVENTION

Problem to be Solved by the Invention

With the airbag device of Patent Document 1, in addition to center airbags being stowed in each of two adjacent vehicle seats, retainers also have to be stowed to cause the center airbags to expand and deploy in an oblique direction inside the vehicle. Therefore, with Patent Document 1, the number of components increases, and installation work becomes time consuming. Furthermore, two center airbags expand and deploy so the amount of gas needed for expansion and deployment is also increased.

In light of the forgoing, an object of the present invention is to provide a side airbag device that reduces the amount of gas needed for expansion and deployment and enables quick expansion and deployment to improve protection performance of an occupant.

Means for Solving the Problem

To resolve the problem described above, a typical configuration of a side airbag device according to the present invention includes:
an inflator; and
a cushion in a bag shape, provided to a side of a vehicle seat seatback, that uses gas supplied from the inflator to expand and deploy to a side of an occupant in the vehicle seat, wherein
the cushion includes:
a first portion having at least three sides and that includes a first chamber that can expand and deploy;
a second portion having at least three sides, that is adjacent to the first portion,
and that includes a second chamber that can expand and deploy; and
a third portion having at least three sides, is non-expanding, and that is adjacent to the first portion and the second portion, and
the cushion in an expanded and deployed state has a columnar or pyramidal shape having a space extending contiguous in the vertical direction that is surrounded by the first portion with the first chamber expanded and deployed,
the second portion with the second chamber expanded and deployed, and the non-expanding third portion.

With the configuration described above, when the cushion is in an expanded and deployed state, only the first chamber of the first portion and second chamber of the second portion of the first portion, second portion, and third portion expands and deploys. In addition, the third portion is connected to the first portion containing the first chamber and the second portion containing the second chamber, and so is pulled from the first portion and the second portion when the first chamber and the second chamber expand and deploy.

With the cushion in an expanded and deployed state, the first portion, second portion, and third portion are arranged tautly surrounding a space contiguous in the vertical direction and further have an overall columnar or pyramidal shape. Therefore, the cushion, with the space, in addition to the first portion, second portion, and third portion, as a whole can receive and protect the occupant.

In addition, only the first chamber of the first portion and the second chamber of the second portion expand and deploy so the amount of gas needed for expansion and deployment can be reduced. Therefore, the cushion can expand and deploy more quickly, enabling improving protection performance of the occupant.

Furthermore, the cushion in an expanded and deployed state forms a triangular shape composed of the first portion, second portion, and third portion as viewed from the vertical direction and so does not readily collapse when receiving the occupant. Furthermore, with the cushion, a reaction surface can be formed for at least one portion out of the first portion, second portion, and third portion for when the occupant is received, enabling improving the restraining force for supporting the occupant.

For the space described above, at least one of the top or bottom is open. Thus, in addition to the first portion, the second portion, and the third portion, the cushion in an expanded and deployed state includes a space having at least one of the top or bottom open enabling receiving and protecting the occupant as a whole.

The first portion, second portion, and third portion described above may all have four sides and the cushion, in an expanded and deployed state, may form a triangular column. Since the cushion in an expanded and deployed state forms a triangular column, the cushion does not readily collapse when receiving and stopping the occupant, enabling reliable restraint and protection of the occupant.

Both the top and the bottom of the space described above may be open. Thus, in addition to the first portion, the second portion, and the third portion, the cushion in an expanded and deployed state includes a space having both the top or bottom open, enabling receiving and protecting the occupant as a whole.

With the cushion in an expanded and deployed state, the third portion should face the occupant sitting in the vehicle seat. Thus, in an expanded and deployed state, the cushion receives and stops the occupant using the third portion. Furthermore, with the cushion, even if the occupant received and stopped by the third portion attempts to enter the space, the first chamber and the second chamber are expanded and deployed, so the first portion and the second portion impart tension to the third portion. Therefore, with the cushion in an expanded and deployed state, the reaction force of the third portion enables suppressing movement of the occupant.

The boundary of the first portion and the third portion is secured to a side part of the vehicle seat seatback and the first portion faces another vehicle seat adjacent to the vehicle seat with the cushion in an expanded and deployed state.

Therefore, with the cushion in an expanded and deployed state, in the case the occupant received and stopped by the third portion further attempts to enter the space, the occupant will rotate with the boundary of the first portion secured to a side part of the seatback of the vehicle seat (driver seat) and the third portion as an axis. Furthermore, the first portion comes into contact with the other vehicle seat (passenger seat) or occupant seated in the other vehicle seat. Therefore, with the cushion the first portion becomes a reaction surface further enabling suppressing movement of the occupant seated in the vehicle seat. Furthermore, in the case that an occupant is sitting in the other vehicle seat, the first portion can also suppress movement of this occupant.

The cushion further includes one or more ducts formed between the first portion and the second portion allowing gas to flow between the first chamber and the second chamber,
the first chamber of the first portion includes a gas introduction opening for introducing gas from the inflator, and
the inflator is installed on a seat frame arranged in the vehicle seat seatback and is inserted into the first chamber through the gas introduction opening.

Therefore, during expansion and deployment of the cushion, gas is supplied from the inflator through the gas introduction opening to the first chamber of the first portion, enabling reliable expansion and deployment of the first chamber. Furthermore, gas flows through the ducts between the first chamber of the first portion and the second chamber of the second portion so the second chamber also reliably expands and deploys.

The one or more ducts described above may include an upper duct provided in an upper part between the first portion and the second portion and a lower duct provided in a lower part. Thus, for the cushion, gas flows through the upper duct and the lower duct between the first portion and the second portion during expansion and deployment to the first chamber and the second chamber. Therefore, the cushion retains the shape of the first portion and the second portion while enabling reliable expansion and deployment of the first chamber and the second chamber.

The one or more ducts described above may include a center duct provided in the center part in the vertical direction between the first portion and the second portion. Thus, for the cushion, in addition to the upper duct and the lower duct, gas also flows in the center duct between the first portion and the second portion during expansion and deployment to the first chamber and the second chamber. Therefore, the cushion more reliably retains the shape of the first portion and the second portion while enabling more reliable expansion and deployment of the first chamber and the second chamber.

The first portion described above may include a first non-expanding part adjacent to the first chamber. In this manner, the first portion includes a first non-expanding part so the amount of gas needed to expand and deploy the first chamber can be reduced. Therefore, the cushion can be expanded and deployed more quickly.

The second portion described above may include a second non-expanding part adjacent to the second chamber. In this manner, the second portion includes a second non-expanding part so the amount of gas needed to expand and deploy the second chamber can be reduced. Therefore, the cushion can be expanded and deployed more quickly.

Effect of the Invention

With the present invention, a side airbag device that reduces the amount of gas needed for expansion and deployment and that enables quick expansion and deployment, thus improving protection performance of the occupant, can be provided.

DESCRIPTION OF THE PREFERRED EMBODIMENTS

Preferred Embodiments according to the present invention will hereinafter be described in detail with reference to the attached drawings. Dimensions, materials, other specific numerical values, and the like indicated in the Embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

Figure 1:
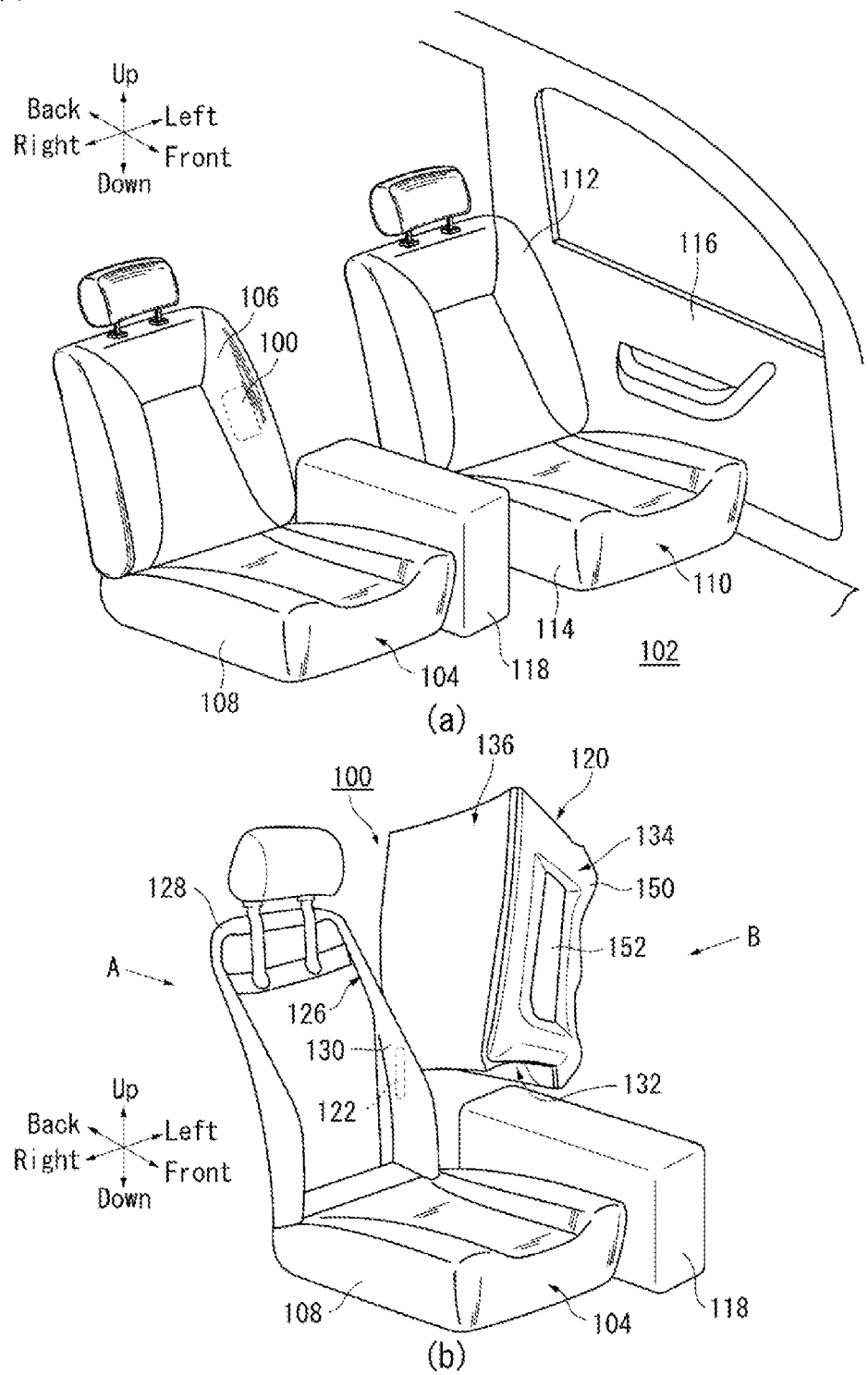
FIG. 1 is a diagram depicting an outline of a side airbag device according to an embodiment of the present invention.

FIG. 1 is a diagram depicting an outline of a side airbag device 100 according to an embodiment of the present invention. FIG. 1(a) is a perspective view depicting a part of the inside of the vehicle 102. FIG. 1(b) is a diagram depicting a side airbag device 100 of FIG. 1(a) together with a vehicle seat 104.

Regarding the present Embodiment, when an occupant is seated in a seat in a regular posture, the direction the occupant faces is referred to as front, and the opposite direction is referred to as rear. Furthermore, when the occupant is seated in the seat in a regular posture, the right of the occupant is referred to as the right direction, and the left of the passenger is referred to as the left direction. Furthermore, when the occupant is seated in a regular posture, the direction towards the head of the occupant is referred to as up, and the direction towards the legs of the occupant is referred to as down. Furthermore, as needed, any diagrams used in descriptions below will indicate the front, rear, left, right, up, and down directions based on the occupant as described above as Front, Rear, Left, Right, Up, and Down.

As indicated by the dotted lines in FIG. 1(a), the side airbag device 100 is embedded in a side portion on a center side of the vehicle of a seatback 106 of the vehicle seat 104. The vehicle seat 104 is a right-side front seat (in other words, a driver's seat) in the vehicle 102 and has the seatback 106 as well as a seat cushion 108 on which an occupant is seated.

A vehicle seat 110 adjacent to the vehicle seat 104 is arranged in the vehicle 102. The vehicle seat 110 is a left-side front seat (in other words, a front passenger seat) and has a seatback 112 and a seat cushion 114. Furthermore, a side door 116 is positioned on an outer side of the vehicle of the vehicle seat 110. A center console 118 is arranged between the vehicle seats 104 and 110. Note that the side airbag device 100 may be embedded in a side surface on the center side of the vehicle of the vehicle seat 110.

As depicted in FIG. 1(b), the side airbag device 100 is provided with a bag shaped cushion 120 that expands and deploys and an inflator 122 indicated by the dotted line. The cushion 120 uses the gas supplied from the inflator 122 (see FIG. 2(a)) that is the gas generator to expand and deploy to the side of an occupant 124 (see FIG. 3) of the vehicle seat 104.

FIG. 1(b) illustrates only a seatback frame 126 of the seatback 106 of the vehicle seat 104 of FIG. 1(a), omitting the upholstery and seat pad (for example, the urethane material). The seatback frame 126 is a member that becomes the skeletal structure of the seatback 106, and includes an upper frame 128 and a side frame 130. The upper frame 128 is included in the seatback 106 along the upper edge of the seatback 106. Additionally, the side frame 130 is included in the seatback 106 along the side surface of the seatback 106.

Figure 2:
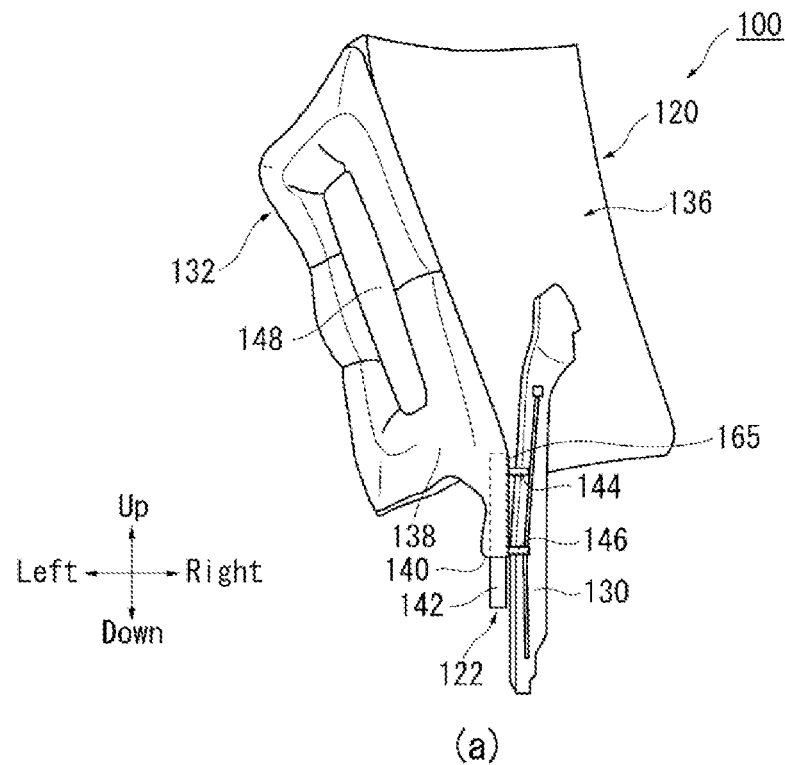
FIG. 2 is a diagram depicting an example of a state of a cushion of FIG. 1(b) as viewed from another direction.
Figure 2:
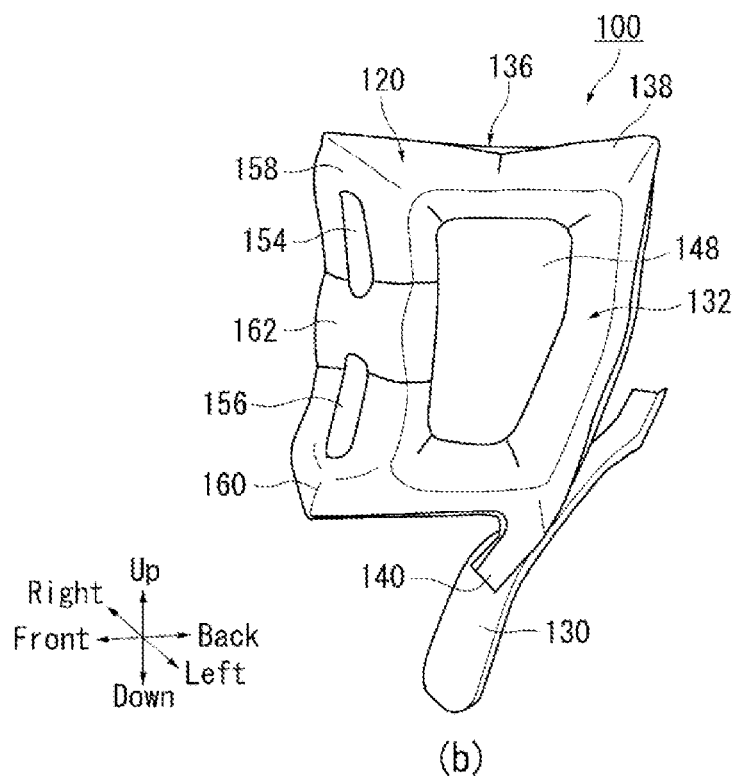

FIG. 2 is a diagram depicting an example of a state of the cushion 120 of FIG. 1(b) as viewed from another direction; FIG. 2(a) is a view taken along arrow A in FIG. 1(b) and illustrates the cushion 120, inflator 122, and side frame 130. FIG. 2(b) is a view taken along arrow B in FIG. 1(b) and illustrates only the cushion 120 and side frame 130.

The cushion 120 includes a first portion 132, a second portion 134 (see FIG. 1(b)), and a third portion 136. The first portion 132 includes a longitudinal shaped portion with four sides depicted in FIG. 2 and contains a first chamber 138 that can expand and deploy. The first chamber 138 includes a gas introduction opening 140 for introducing gas from the inflator 122 depicted in FIG. 2(a).

The inflator 122 has a cylinder shape (tubular) and a part thereof is inserted into the first chamber 138 through the gas introduction opening 140. In addition, the inflator 122 is installed in the center of the side frame 130 in the vehicle width direction arranged inside the seatback 106 of the vehicle seat 104 by stud bolts 144 and 146 protruding from a main body 142.

Furthermore, the first portion 132 includes a first non-expanding part 148. The first non-expanding part 148 is, for example, a seam part positioned in the center of the first portion 132 depicted in FIG. 2(b), and the first chamber 138 is adjacent to the periphery thereof. In this manner, the first portion 132 includes the first non-expanding part 148, reducing the amount of gas needed for expansion and deployment of the first chamber 138.

Figure 4:
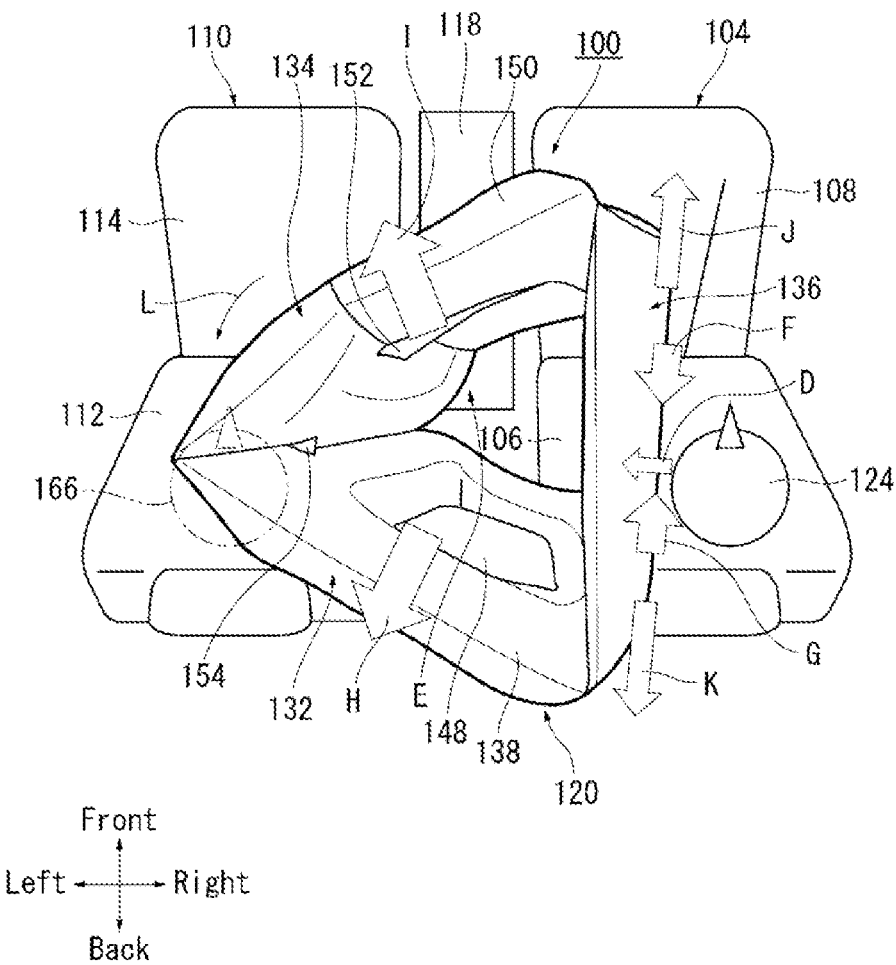
FIG. 4 is a diagram depicting an example of a state of looking down on the side airbag device of FIG. 3 from above the vehicle.

The second portion 134 is a rectangular portion with four sides depicted in FIG. 1(b) and further, is adjacent to the first portion 132 (see FIG. 4). In addition, the second portion 134 includes a second chamber 150 that can expand and deploy and a second non-expanding part 152.

The second non-expanding part 152 is a seam part positioned, for example, in the center of the second portion 134 as depicted in FIG. 1(b) and is adjacent to the second chamber 150 on the periphery thereof. In this manner, the second portion 134 includes the second non-expanding part 152, reducing the amount of gas needed for expansion and deployment of the second chamber 150.

The third portion 136 is a non-expanding portion and forms a rectangle with four sides, as depicted in FIG. 2(a) and is adjacent to the first portion 132 and the second portion 134 (see FIG. 4).

The cushion 120 further includes a third non-expanding part 154 and a fourth non-expanding part 156, as depicted in FIG. 2(b). The third non-expanding part 154 and fourth non-expanding part 156 are seam parts and are formed spaced vertically between the first portion 132 and the second portion 134.

With the cushion 120, an upper duct 158, lower duct 160, and center duct 162 are formed between the first portion 132 and the second portion 134 by the third non-expanding part 154 and fourth non-expanding part 156 that are separated vertically. The upper duct 158, lower duct 160, and center duct 162 cause gas to flow between the first chamber 138 and the second chamber 150.

The upper duct 158 is provided at the top between the first portion 132 and the second portion 134, in other words, above the third non-expanding part 154. The lower duct 160 is provided at the bottom between the first portion 132 and the second portion 134, in other words, below the fourth non-expanding part 156. The center duct 162 is provided in the middle between the first portion 132 and the second portion 134, in other words, between the third non-expanding part 154 and the fourth non-expanding part 156.

Therefore, during expansion and deployment of the cushion 120, gas is supplied from the inflator 122 through the gas introduction opening 140 to the first chamber 138 of the first portion 132, enabling reliable expansion and deployment of the first chamber 138. Furthermore, the first chamber 138 expands and deploys and gas flows through the upper duct 158, lower duct 160, and center duct 162 to the second chamber 150, enabling reliable expansion and deployment of the second chamber 150 as well. In this manner, through reliable expansion and deployment of the first chamber 138 and the second chamber 150, the shape of the first portion 132 and the second portion 134 of the cushion 120 can be reliably maintained during expansion and deployment.

Figure 3:
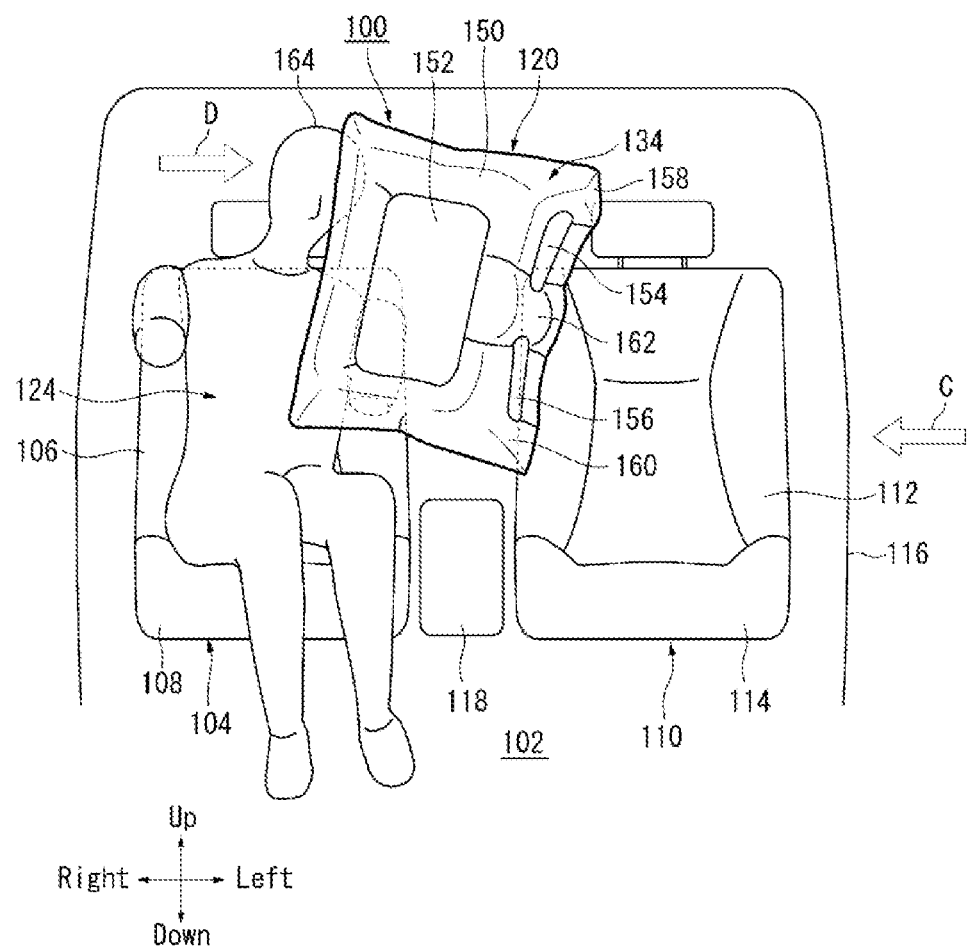
FIG. 3 is a diagram depicting an example of a state of the side airbag device with an occupant sitting in a vehicle seat in FIG. 1(b) as viewed from the front of the vehicle.

FIG. 3 is a diagram depicting an example of a state of the side airbag device 100 with the occupant 124 sitting in the vehicle seat 104 in FIG. 1(b) as viewed from the front of the vehicle. FIG. 4 is a diagram depicting an example of a state of looking down on the side airbag device 100 of FIG. 3 from above the vehicle.

In addition, FIG. 3 depicts the vehicle 102 receiving an impact in the lateral direction (see arrow C) from a side collision and a state of the occupant 124 moving to the center of the vehicle due to receiving impact in the lateral direction (see arrow D) towards the center of the vehicle, caused by inertia. In other words, the line of motion of the occupant 124 involved in a side collision is in the lateral direction indicated by arrows C and D (in other words, the vehicle width direction).

The side airbag device 100 receives and stops, for example, a head 164 of the occupant 124 moving in the direction indicated by arrow D, by means of the expanded and deployed cushion 120, as depicted in FIG. 3.

The cushion 120 in an expanded and deployed state has a columnar shape (in this case a triangular column) with a space E opened at both top and bottom as indicated in FIG. 4. This space E is surrounded by the first portion 132 with the first chamber 138 expanded and deployed, the second portion 134 with the second chamber 150 expanded and deployed, and the non-expanding third portion 136. The space E is a space that extends contiguously in the vertical direction.

The third portion 136 of the cushion 120 connects the first portion 132 containing the first chamber 138 and the second portion 134 containing the second chamber 150, and is pulled from the first portion 132 and the second portion 134 when the first chamber 138 and the second chamber 150 expand and deploy.

Therefore, the expanded and deployed cushion 120 is arranged with the first portion 132, second portion 134, and third portion 136 tautly surrounding the space E, and further forms an overall triangular column shape. Therefore, the cushion 120, with the space E, in addition to the first portion 132, second portion 134, and third portion 136, as a whole can receive and protect the occupant 124.

In addition, in the expanded and deployed state, of the first portion 132, the second portion 134, and the third portion 136 of the cushion 120, only the first chamber 138 of the first portion 132, and the second chamber 150 of the second portion 134 expand and deploy so the amount of gas needed for expansion and deployment can be reduced. Therefore, the cushion 120 can expand and deploy more quickly, enabling improving protection performance of the occupant 124.

Furthermore, as viewed from the vertical direction, the cushion 120 in an expanded and deployed state, depicted in FIG. 4, forms a triangular shape composed of the first portion 132, the second portion 134, and the third portion 136, and furthermore has an overall triangular columnar shape and so does not readily collapse when receiving the occupant 124, enabling reliable restraint and protection of the occupant 124.

Here, the third portion 136 depicted in FIG. 4 faces the side of the occupant 124 sitting in the vehicle seat 104 with the cushion 120 in an expanded and deployed state. Therefore, with the cushion 120 in an expanded and deployed state, the occupant 124 moving in the direction of the arrow D is received and stopped by the third portion 136. Furthermore, with the cushion 120, as the occupant 124 received and stopped by the third portion 136 attempts to move further and enter the space E, a tensile force indicated by arrows F and G is imparted on the third portion 136.

In contrast, with the cushion 120, as the first chamber 138 and second chamber 150 have expanded and deployed, expansion forces indicated by arrows H and I are generated respectively in the first portion 132 and the second portion 134. Furthermore, with the cushion 120 and in conjunction with this expansion force, the first portion 132 and the second portion 134 can apply a tensile force (see arrows J and K) counter to the tensile forces indicated by arrows F and G to the third portion 136. Therefore, with the cushion 120 in an expanded and deployed state, the reaction force of the third portion 136 enables suppressing movement of the occupant 124.

In addition, as indicated in FIG. 2(a), with the cushion 120, a boundary 165 of the first portion 132 and the third portion 136 is secured to the side frame 130 that is a side part of the seatback 106 of the vehicle seat 104. In addition, as indicated in FIG. 4, with the cushion 120 in an expanded and deployed state, the first portion 132 faces the other vehicle seat 110 adjacent to the vehicle seat 104.

Therefore, with the cushion 120 in an expanded and deployed state, even if the occupant 124 received and stopped by the third portion 136 attempts to further enter the space E, the occupant will rotate in the direction indicated by the arrow L in FIG. 4 with the boundary 165 of the first portion 132 secured to the side frame 130 of the vehicle seat 104 and the third portion 136 as an axis. Subsequently, the first portion 132 contacts the other vehicle seat 110 or an occupant 166 seated in the vehicle seat 110 indicated by a dotted line in the diagram.

Therefore, with the cushion 120, the first portion 132 becomes a reaction force surface, enabling further suppressing movement of the occupant 124 seated in the vehicle seat 104. In this manner, when the occupant 124 is received and stopped using the cushion 120, a reaction surface can be formed by the first portion 132 and the third portion 136 enabling further increase of the restraining force supporting the occupant 124. Furthermore, if the occupant 166 is seated in the other vehicle seat 110, the cushion 120 can also suppress movement of the occupant 166 by means of the first portion 132.

Figure 5:
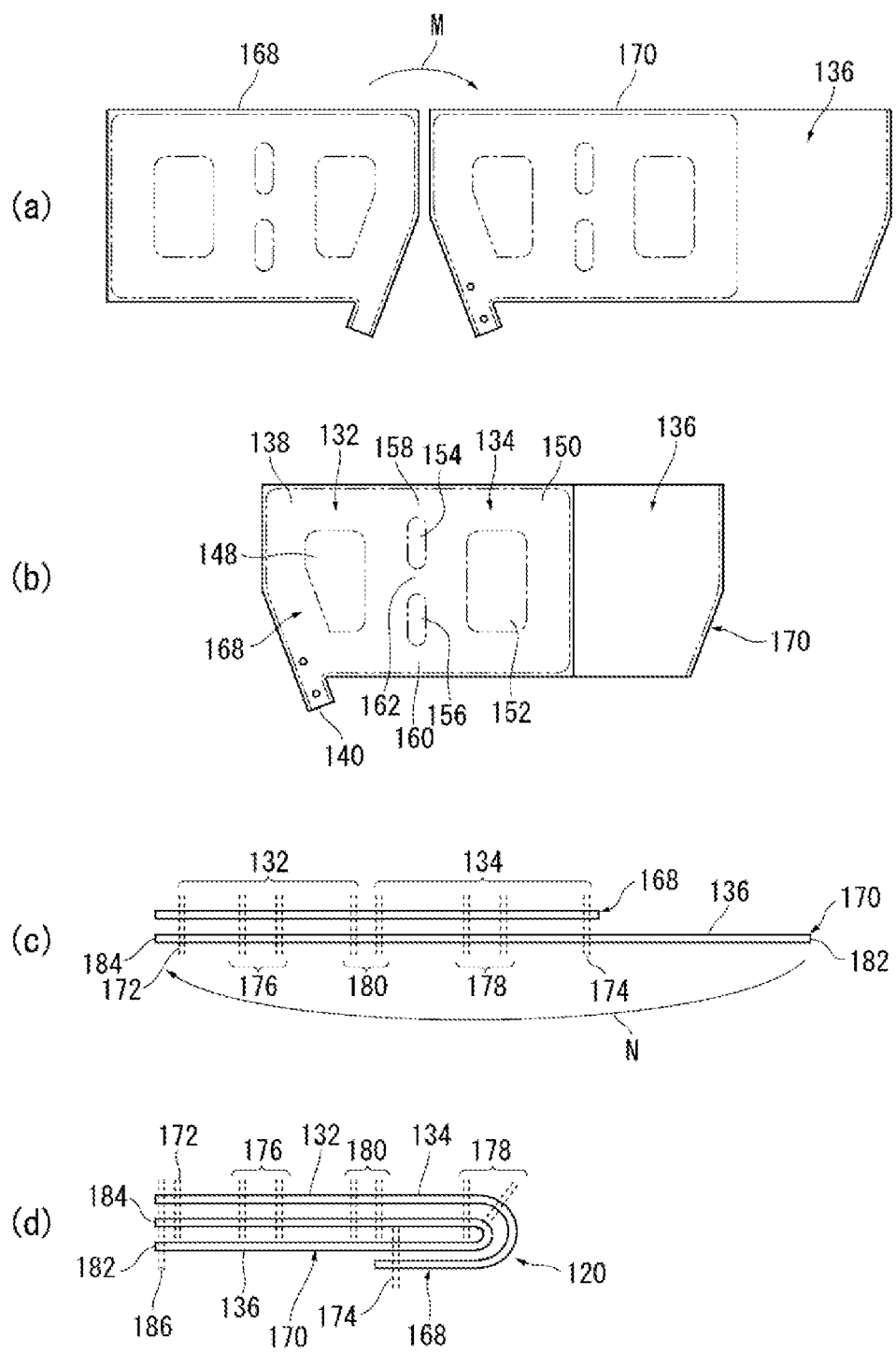
FIG. 5 is a diagram depicting an example of a sewing process for the cushion of FIG. 1(b)

FIG. 5 is a diagram depicting an example of a sewing process for the cushion 120 of FIG. 1(b). The cushion 120 is formed by sewing and folding a first base material 168 and a second base material 170 depicted in FIG. 5(a).

Specifically, the first base material 168 depicted in FIG. 5(a) is overlaid with the second base material 170 as indicated by the arrow M. The second base material 170 has a part thereof that has a shape symmetrical with the first base material 168 as well as a third portion 136.

With the first base material 168 overlaid on the second base material 170, as indicated in FIG. 5(b), external sewing is performed as indicated by sewing lines 172 and 174 in FIG. 5(c). In addition, the first non-expanding part 148 and the second non-expanding part 152 in FIG. 5(b) are sewn as indicated by sewing lines 176 and 178 of FIG. 5(c). Furthermore, the third non-expanding part 154 and fourth non-expanding part 156 of FIG. 5(b) are sewn as indicated by sewing line 180 of FIG. 5(c).

Next, as indicated by the arrow N in FIG. 5(c), the second base material 170 is folded so that the first base material 168 and the second base material 170 overlap such that a first end 182 of the second base material 170 overlaps with a second end 184 outside a sewing line 172. Furthermore, as indicated by a sewing line 186 in FIG. 5(d), the first base material 168 is overlain and sewn together with the second base material 170 having the first end 182 and second end 184 in an overlapped state.

This manner of sewing process enables forming the cushion 120 described above in a triangular columnar shape during expansion and deployment including a first portion 132 with a first chamber 138, a second portion 134 with a second chamber 150 and adjacent to the first portion 132, and a non-expanding third portion 136 adjacent to the first portion 132 and second portion 134.

Figure 6:
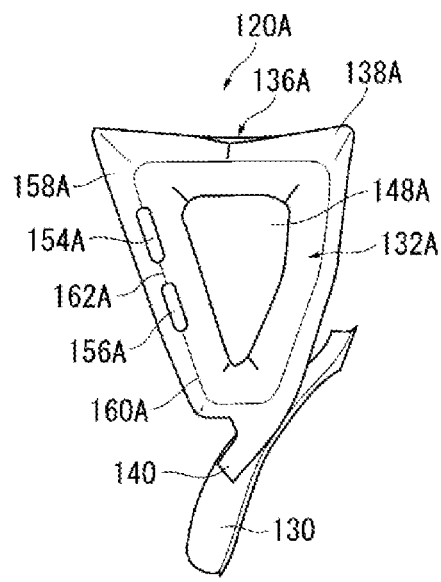
FIG. 6 is a diagram illustrating a Modified Example of the cushion in FIG. 1(b).
Figure 6:
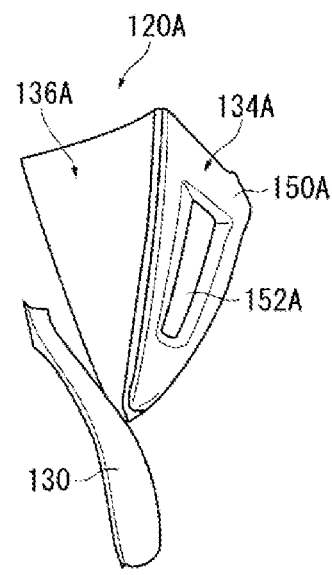
Figure 6:
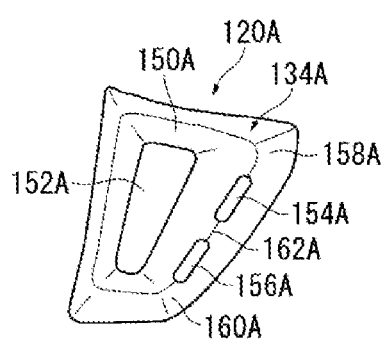
Figure 6:
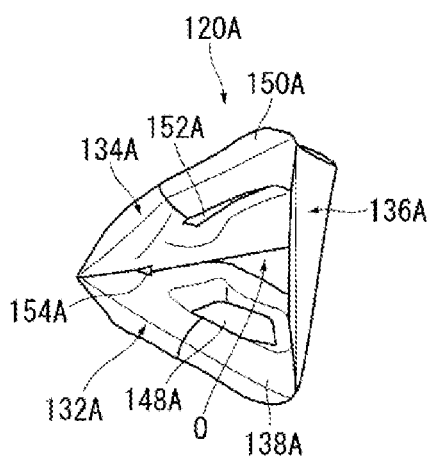

FIG. 6 is a diagram illustrating a Modified Example of the cushion 120 of FIG. 1(b). A cushion 120A of the Modified Example differs from the cushion 120 described above in having a cone shape (inverted triangular pyramid) during expansion and deployment.

The cushion 120A includes a first portion 132A, a second portion 134A, and a third portion 136A. The first portion 132A is an inverted triangular portion having three sides indicated in FIG. 6(a) and includes a first chamber 138A that expands and deploys. The second portion 134A is an inverted triangular portion having three sides as indicated in FIG. 6(b) and FIG. 6(c) and includes a second chamber 150A that expands and deploys. The third portion 136A is an inverted triangular non-expanding portion having three sides as indicated in FIG. 6(b).

In addition, the first portion 132A and second portion 134A respectively include a first non-expanding part 148A and a second non-expanding part 152A. Furthermore, with the cushion 120A, an upper duct 158A, lower duct 160A, and center duct 162A are formed between the first portion 132A and the second portion 134A by a third non-expanding part 154A and fourth non-expanding part 156A that are separated vertically.

Therefore, with the cushion 120A, gas from the inflator 122 (see FIG. 2(a)) is supplied through the gas introduction opening 140 to the first chamber 138A of the first portion 132A so the first chamber 138A reliably expands and deploys. Furthermore, for the cushion 120A, gas flows through the upper duct 158A, lower duct 160A, and center duct 162A between the first chamber 138A and the second chamber 150A so the second chamber 150A reliably expands and deploys as well.

As depicted in FIG. 6(d), the expanded and deployed cushion 120A is surrounded by the first portion 132A of the expanded and deployed first chamber 138A, the second portion 134A of the expanded and deployed second chamber 150A, and the non-expanding third portion 136A, and has a space O that is only open upwards in the vertical direction. The space O is a space that extends contiguously in the vertical direction.

The third portion 136A of the cushion 120A connects the first portion 132A containing the first chamber 138A and the second portion 134A containing the second chamber 150A. Therefore, when the first chamber 138A and second chamber 150A expand and deploy, the third portion 136A is pulled by the first portion 132A and the second portion 134A.

Thus, with the cushion 120A in an expanded and deployed state, the first portion 132A, second portion 134A, and third portion 136A are arranged in a taut state surrounding the space O and further have an overall inverted triangular pyramid shape. Therefore, the cushion 120A, with the space O, in addition to the first portion 132A, second portion 134A, and third portion 136A, as a whole can receive and protect the occupant 124 (see FIG. 4).

Note that space E of the cushion 120 is a contiguous space extending in the vertical direction and is open both upwards and downwards but is not limited to this, where of the top and bottom, closing only the top with a cell panel or the like, closing only the bottom with a cell panel or the like, or closing both top and bottom with a cell panel or the like are feasible.

In addition, the space O of the cushion 120A is a contiguous space extending in the vertical direction and of the top and bottom, only the top is open, but the top may be closed with a cell panel or the like. In this manner, by including a contiguous space extending in the vertical direction surrounded by various portions, the cushion in an expanded and deployed state can better receive and protect the occupant from an overall perspective, including each portion and the space.

Preferred Embodiments of the present invention were described with reference to the appended drawings, but it goes without saying that the present invention is not limited to such examples. It is clear that a person of ordinary skill in the art could conceive various modifications or revisions within the scope set forth by the claims, and it would be understood that these modifications or revisions would belong to the technical scope of the present invention.

Moreover, the example in which the side airbag device 100 according to the present invention is applied to automobiles has been described in the abovementioned embodiments. However, in addition to automobiles, the present invention can be applied to aircrafts, ships, and the like, with the same operations and effects capable of being exerted.

INDUSTRIAL APPLICABILITY

The present invention can be applied to a side airbag device provided with a bag-shaped cushion that expands and deploys to a side of an occupant in a vehicle seat in the event of a vehicle side impact or the like.

EXPLANATION OF CODES

100. Side airbag device; 102. Vehicle; 104, 110. Vehicle seat; 106, 112. Seatback; 108, 114. Seat cushion; 116. Side door; 118. Center console; 120, 120A. Cushion; 122. Inflator; 124, 166. Occupant; 126. Seatback frame; 128. Upper frame; 130. Side frame; 132, 132A. First portion; 134, 134A. Second portion; 136, 136A. Third portion; 138, 138A. First chamber; 140. Gas introduction opening; 142. Inflator main body; 144, 146. Stud bolt; 148, 148A. First non-expanding part; 150, 150A. Second chamber; 152, 152A. Second non-expanding part; 154, 154A. Third non-expanding part; 156, 156A. Fourth non-expanding part; 158, 158A. Upper duct; 160, 160A. Lower duct; 162, 162A. Center duct; 164. Head of occupant; 165. Boundary of first portion and third portion; 168. First base material; 170. Second base material; 172, 174, 176, 178, 180, 186. Sewing lines; 182. First end of the second base material; 184. Second end of the second base material.

The invention claimed is:

1. A side airbag device, comprising:
an inflator; and
a cushion in a bag shape, the cushion provided at a side of a vehicle seat seatback, the cushion inflatable and deployable with gas supplied from the inflator to a side of an occupant in the vehicle seat,
wherein the cushion includes:
a first portion having at least three sides, the first portion including a first chamber that is expandable and deployable;

a second portion having at least three sides, the second portion adjacent to the first portion, the second portion including a second chamber that is expandable and deployable; and a third portion having at least three sides, the third portion being non-expanding, and adjacent to both the first portion and the second portion, and the cushion in an expanded and deployed state has a columnar or pyramidal shape having a space extending contiguous in the vertical direction that is surrounded by the first portion with the first chamber expanded and deployed, the second portion with the second chamber expanded and deployed, and the non-expanding third portion, the first portion deployable in a forward direction and a lateral direction such that the first portion defines a reactionary surface for further enabling suppressing movement of the occupant seated in the seat, wherein the first, second and third portions define a triangle with the first and second portions intersecting to define an acute interior angle.

2. The side airbag device according to claim 1, wherein at least one of the top or bottom of the space is open.

3. The side airbag device according to claim 1, wherein the first portion, second portion, and third portion all have four sides, and the cushion forms a triangular column in an expanded and deployed state.

4. The side airbag device according to claim 1, wherein the both the top and the bottom of the space are open.

5. The side airbag device according to claim 1, wherein the third portion faces the occupant sitting in the vehicle seat with the cushion in an expanded and deployed state.

6. The side airbag device according to claim 5, wherein the boundary of the first portion and the third portion is secured to a side part of the vehicle seat seatback, and the first portion faces another vehicle seat adjacent to the vehicle seat with the cushion in an expanded and deployed state.

7. The side airbag device according to claim 1, wherein the cushion further includes one or more ducts formed between the first portion and the second portion allowing gas to flow between the first chamber and the second chamber, the first chamber of the first portion includes a gas introduction opening for introducing gas from the inflator, and the inflator is installed on a seat frame arranged in the vehicle seat seatback and is inserted into the first chamber through the gas introduction opening.

8. The side airbag device according to claim 7, wherein the one or more ducts include an upper duct provided on an upper part between the first portion and the second portion and a lower duct provided on a lower part.

9. The side airbag device according to claim 8, wherein the one or more ducts further includes a center duct provided in a center part in the vertical direction between the first portion and the second portion.

10. The side airbag device according to claim 1, wherein the first portion includes a first non-expanding part adjacent to the first chamber.

11. The side airbag device according to claim 1, wherein the second portion includes a second non-expanding part adjacent to the second chamber.

12. The side airbag device according to claim 1, wherein, the second portion is expandable in a rearward direction and the lateral direction.

13. The side airbag device according to claim 1 in combination with a vehicle seating arrangement include the vehicle seat and a further vehicle seat disposed laterally to the vehicle seat, the reaction surface defined by the first portion adapted to contact one of the further vehicle seat and a further occupant sitting in the further vehicle seat.

14. The side airbag device according to claim 1, wherein the first, second and third portions define an acute triangle.

15. The side airbag device according to claim 1, wherein the first and second portions both include a non-expandable portion completely circumscribed by an expandable portion.

16. A side airbag device comprising:

an inflator; and a cushion in a bag shape, the cushion provided at a side of a vehicle seat seatback, the cushion inflatable and deployable with gas supplied from the inflator to a side of an occupant in the vehicle seat, wherein the cushion includes:

a first portion including a first chamber that is expandable and deployable;

a second portion adjacent to the first portion, the second portion including a second chamber that is expandable and deployable; and a third portion being non-expanding, and adjacent to both the first portion and the second portion, and the cushion in an expanded and deployed state has a columnar or pyramidal shape having a space extending contiguous in the vertical direction that is surrounded by the first portion with the first chamber expanded and deployed, the second portion with the second chamber expanded and deployed, and the non-expanding third portion, the first portion deployable in a forward direction and a lateral direction such that the first portion defines a reactionary surface for further enabling suppressing movement of the occupant seated in the seat, wherein the first, second and third portions define a triangle with the first and second portions intersecting to define an acute interior angle.

17. The side airbag device according to claim 16, wherein the first, second and third portions define an acute triangle.

* * * * *